United States Patent [19]

Kuzuhara

[11] Patent Number: 4,901,176
[45] Date of Patent: Feb. 13, 1990

[54] MAGNETIC HEAD SUPPORT ASSEMBLY FOR FLOPPY DEVICE

[75] Inventor: Takashi Kuzuhara, Tokyo, Japan
[73] Assignee: Kabushiki Kaisha Toshiba, Kawasaki, Japan
[21] Appl. No.: 149,835
[22] Filed: Jan. 29, 1988
[30] Foreign Application Priority Data Jan. 31, 1987 [JP] Japan ................. 62-21295

[51] Int. Cl.⁴ ........................ G11B 21/20; G11B 21/24
[52] U.S. Cl. ..................................... 360/104; 360/109
[58] Field of Search ................. 360/104, 103, 105, 109

[56] References Cited

U.S. PATENT DOCUMENTS

| 4,034,412 | 7/1977 | Smith .................................... 360/103 |
| 4,089,029 | 5/1978 | Castrodale et al. .................... 360/99 |
| 4,291,350 | 9/1981 | King et al. ............................ 360/104 |
| 4,309,732 | 1/1982 | Kronfeld et al. .................... 360/104 |
| 4,703,375 | 10/1987 | Chan et al. ........................... 360/104 |

FOREIGN PATENT DOCUMENTS 56-41872 9/1954 Japan.
59-56259 3/1984 Japan.

Primary Examiner—John H. Wolff
Assistant Examiner—Matthew J. Bussan
Attorney, Agent, or Firm—Cushman, Darby & Cushman

[57] ABSTRACT

Disclosed is a magnetic head support assembly for a floppy disc device, in which the pressure of a spring to a magnetic head against a floppy disc is finely adjusted so as to apply a predetermined pressure thereto and to obtain an excellent contact condition between the magnetic head and magnetic disc.

5 Claims, 2 Drawing Sheets

MAGNETIC HEAD SUPPORT ASSEMBLY FOR FLOPPY DEVICE

The present application claims priority of Japanese patent application No. 62-21295 filed on Jan. 31, 1987.

FIELD OF THE INVENTION AND RELATED ART STATEMENT

The present invention relates to a magnetic head assembly for a floppy disc device which is used as a playback means for computer or word-processor etc.

Conventionally, a supporting assembly of a magnetic head, which is used in a floppy disc device to conduct the operations of writing in and reading of a data through a magnetic head facing to a rotating magnetic disc, is constituted as illustrated in FIG. 5.

FIG. 5 shows a partially sectional side view of the conventional magnetic head support assembly.

In the FIG. 5, numeral 1 designates a carriage, 2 designates a head arm which is mounted on the carriage with a fastening screw 5 through an arm plate spring 3 and a pressure spring 4.

Numeral 6 designates an arm stopper formed on the carriage 1 and 7 designates a level adjusting screw abutting on the arm stopper 6, which determine the level positioning of the head arm 2 by its screwed length.

Further, each arm 1 and 2 is provided with a mounting part 1a, 2a, on which a transducer to write in and read out the data to and from a floppy disc FD and the magnetic head 8 comprised of the head slider which is provided with the transducer are mounted through a gimbal plate 9.

The magnetic head 8 is supported by the gimbal plate 9 to accommodate swingably the bending of the floppy disc FD at its rotation.

Numeral 10 designates a pivot plate spring. While the head arm 2 is held at a predetermined position due to the contact of the screw to the arm stopper 6, the pivot plate spring 10 and the gimbal plate 9 are displaced to the opposite direction of the disc surface so that the magnetic head 8 is pressed against each surface of the floppy disc FD at a predetermined pressure.

In the conventional carriage mechanism thus constituted, the pressing force of the magnetic head 8 against the floppy disc FD depends mainly on the reflection amount of the pivot plate spring 10, because the spring constant of the gimbal plate 9 is small. Accordingly, it is necessary to adjust the pressing force of the magnetic head 8 to the floppy disc surface on assembling the magnetic head. Actually in the conventional magnetic assembly, the deflection amount of the pivot plate spring 10 has been adjusted by varying the screwed length of the level adjusting screw 7 which is used for adjusting the level of the head arm 2. However, since the distance L between the fulcrum A at which the arm stopper 6 supports the head arm 2 and the point of action B at which the pivot plate spring 10 presses the magnetic head 8 is too long, it is difficult to obtain a fine pressure adjustment.

For instance, in a standard magnetic assembly to be mounted on 3.5 inches FDD (floppy disc drive);

The resultant spring constant of the spring constant of the pivot plate spring 10 and the spring constant of the gimbal plate 9 is set up as follows, $$K_{S0} = K_{S1} = 700 \text{ gf/cm}$$

(wherein S0 represents the carriage side of the floppy disc FD (Side 0) and S1 represents the head arm side of the floppy disc FD (side 1)).

Supposing that the distance between the fulcrum C of the movement of the head arm 2 toward and away from the carriage 1 and the fulcrum A is l, the following formulas can be obtained:

$$L+l = 34 \text{ mm}$$

$$l = 7 \text{ mm}$$

If the level adjusting screw 7 is a screw of M3, a pitch (advancing volume per one rotation) is as follows:

$$P = 0.5 \text{ mm}$$

The distance variation between the head arm and the carriage arm for adjusting 1 gram load is calculated as follows:

$$K_{S0+S1} = 700/2 = 350 \text{ gf/cm}$$

$$\therefore \frac{1 \text{ gf}}{350 \times 10^{-1} \text{ gf/mm}} = 0.029 \text{ mm/gf}$$

In this action, the movement of the head arm 2 by the level adjusting screw 7 is as follows:

$$0.029 \text{ mm/gf} \times 7\text{mm}/34\text{mm} = 0.006 \text{ mm/gf}(6 \text{ }\mu\text{m/g})$$

The rotation volume of the screw to advance by 6 $\mu$m with the screw of M3 is calculated as follows:

$$\frac{0.006 \text{ mm/gf}}{0.5 \text{ mm}} \times 360° \approx 4°$$

By the rotation by 4° of the level adjusting screw 7, the pressure of the spring varies by 1 gram.

As shown in the above explanation, according to the conventional magnetic head support assembly, it is difficult to adjust the spring pressure finely, because a small rotation volume of the screw causes a large variation of the spring pressure.

OBJECT AND SUMMARY OF THE INVENTION

An object of the present invention is to provide a magnetic head support assembly for adjusting finely the pressing force of a magnetic head against the magnetic disc.

Another object of the present invention is to provide a magnetic head support assembly which can obtain an excellent contact condition between a magnetic head and a track of a magnetic disc.

To attain the object mentioned above, the present invention comprises a magnetic head to write data in a magnetic disc and read the data from the disc, a gimbal plate supported swingably so as to make the magnetic head follow the movement of the magnetic disc as the disc rotates, a magnetic head supporting member on which the gimbal plate is mounted on the mounting portion formed thereon, a pressure member disposed for pressurizing the magnetic head through the gimbal plate so that to the magnetic head contacts with the disc when the disc rotates, a pressure adjusting member provided with the pressure member and a pressure adjusting screw for pressurizing the pressure member so as to the pressure of the pressure member against the magnetic head be adjusted.

According to the present invention, it is possible to adjust finely the pressure of the magnetic head against the magnetic disc, because it is so constituted as to change the pressure added to the magnetic head, by mounting a pressure adjusting member on a main pressure member which is provided for pressing the magnetic head to the surface of the disc by contacting on the back of the gimbal plate and adjusting, by pressure adjusting screw, the main pressure member pressing force of the pressure adjusting member.

DETAILED DESCRIPTION OF PREFERRED EMBODIMENT

Figure 1:
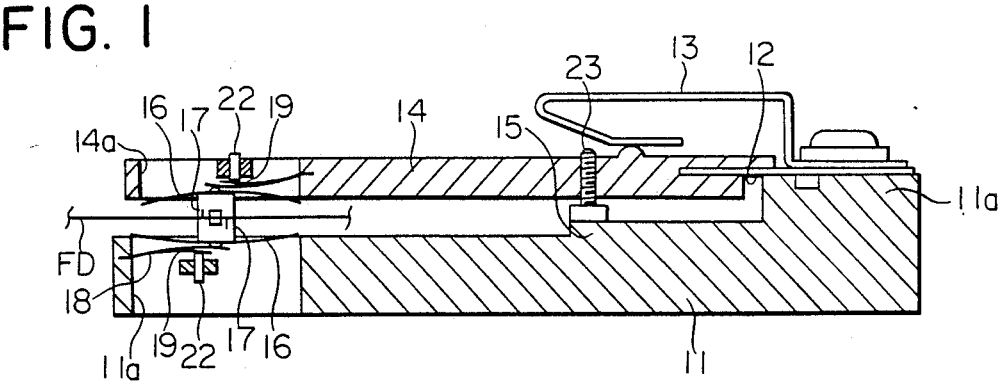
FIG. 1 is a side view partially in section of an embodiment of the present invention for explaining the magnetic head support assembly for a floppy disc device.

Now, an embodiment of the present invention will be explained in detail with reference to FIGS. 1, 2 and 3.

In these drawings, numeral 11 represents a carriage which is the first magnetic head support. At the base 11a of the carriage 11, a head arm which is the second magnetic head support is supported through an arm plate spring 12. The head arm 14 can swing toward and away from the carriage due to the flexibility of the arm plate spring 12. At the base 11a of the carriage 11, further a pressure spring 13 is provided, which gives the head arm 14 a force to make it rotate in the direction approaching the carriage 11. On the carriage 11, an arm stopper 15 is provided and on the head arm 14, a screw 23 is mounted. By the tip end of the screw being in contact with the arm stopper 15, the approaching movement to the carriage 11 of the head arm 14 due to the pressure spring 13 is stopped at a certain position. On the carriage 11 and arm 14, the magnetic head 17 mounting portions 11a and 14a are provided. On the opposite sides of these mounting portions 11a and 14a, the gimbal plates 16 are provided.

The magnetic heads 17 are mounted on these gimbal plates 16. These magnetic heads 17 are provided with transducers to write and read data to a floppy disc FD and the head sliders on which the transducers are mounted and having the sliding surfaces to the disc.

Figure 3:
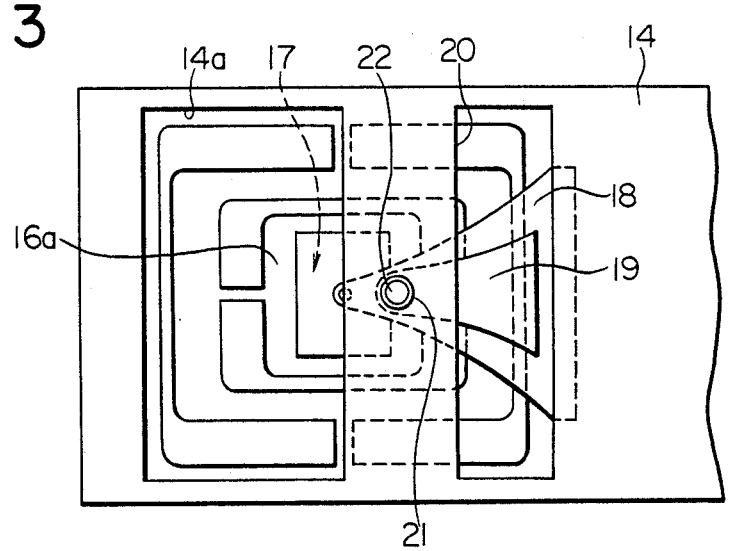
FIG. 3 is a figure of FIG. 2.

As shown in FIG. 3, the gimbal plate 16 has the section 16a on which the magnetic head 17 is mounted in such a manner as to be swingable in the radial direction and circumferential direction. The section 16a can move in the perpendicular direction (Z axis direction) to the surface of the disc with a pivot plate spring 18. Therefore, the magnetic head 17 mounted on the gimbal plate 16 may follow the bending of the floppy disc FD when the disc rotates. However, it is enough for the gimbal plate 16, if it gives a pressure to the magnetic head by moving at least in the Z axis direction. And it is not always necessary to use both or either of the above two swingability of the gimbal plates which may influence the tracking precision and the azimuth precision.

Further, at each mounting portions 11a and 14a of the carriage 11 and arm 14, it is disposed a pressure member 18 to press the projection 16a of the gimbal plate 16 to give the magnetic head a predetermined pressure against the floppy disc FD. On these pivot plate spring 18, the one ends of plate springs 19 which are the pressure adjusting members and have the smaller spring constant than that of the pivot plate spring 18.

The plate spring 19 has such a function that the pivot plate spring 18 increases and decreases the force of pressing the magnetic head by pushing the pivot plate spring 18 and changing the displacement volume of the plate spring 19. However, as the spring constant is small, even if the displacement volume is large, the pressing force varies slightly.

At the aperture type of the mounting portions 11a and 14a, bridges 20 are formed respectively.

These bridges 20 may be the cantilever type of projections or if these portions are groves, those may be the bottom plates of these groves.

The bridge 20 has a screw opening 21. The screw openings 21 are screwed in by the pressure adjusting screws respectively, the tip ends of these screws against the above plate spring 19.

By adjusting the screwed length of the pressure adjusting screw 22, the bending volume of the plate spring 19 changes, so that the force pressing the pivot plate spring 18 by the plate spring 19 changes resulting in the change of the load applied to the magnetic head 17 through the gimbal plate 16.

As described above, the spring constant of the plate spring 19 is small compared to that of the pivot plate spring 18, so that, even though the bending-volume of the plate spring 19 is changed by a large amount, the pressure changes slightly resulting in fine adjustment.

Further, mounting the end of the plate spring 19 on the mounting portion to the arm 14 of the pivot plate spring 18 prevents the change of the pressure to the magnetic head 17 from becoming large due to the change of the bending volume of the pivot plate spring 18 itself by the pressing force of the plate spring 19.

Moreover, the plate spring 19 may be constituted such as one end thereof being mounted on the arm and the other end thereof being in contact with the pivot plate spring 18.

In the carriage system of the floppy disc device thus constituted, since the pressure applied to the magnetic head 17 by the pivot plate spring 18 is changed by pressing the plate spring 19 which is caused from adjusting the screwed length of the pressure adjusting screw 22, it is possible to adjust finely the pressure of the floppy disc FD of the magnetic head 17, so that the excellent contact condition of the magnetic head 17 with the floppy disc FD can be obtained.

Accordingly, on the assumption that the spring constant of the plate spring 19 is K=100 gf/cm, the advancing volume of screw to adjust the pressure by 1 gram is calculated as follows, $$\frac{1 \text{ gf}}{100 \times 10^{-1} \text{ gf/mm}} = 0.1 \text{ mm/g} \ (100 \ \mu\text{m})$$

The rotation volume of the screw M3 to advance by 100 μm is calculated as follows, $$\frac{0.1 \text{ mm/gf}}{0.5 \text{ mm}} \times 360° = 72°$$

Figure 5:
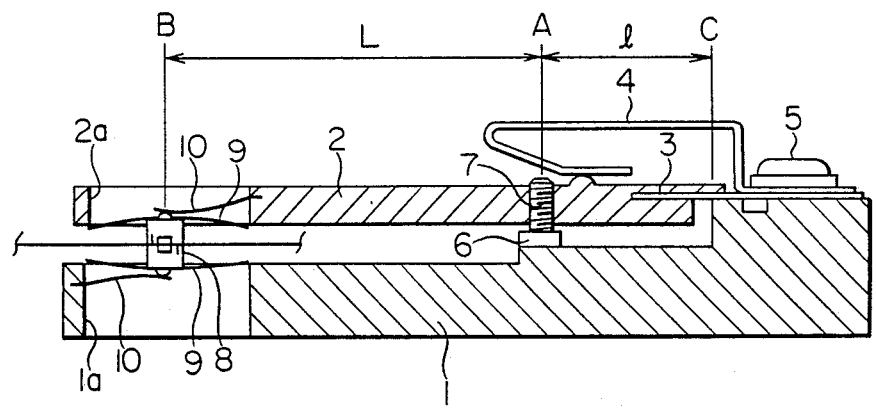
FIG. 5 is a side view partially in section for explaining a conventional magnetic head support assembly.

That is, in the conventional magnetic head support assembly explained based on FIG. 5, while the turning of the level adjusting screw 7 merely by 4° makes the load of the spring change by as much as 1 gram, in the magnetic head support assembly of the embodiment of the present invention, since the pressure of the spring changes by 1 gram by turning the pressure adjusting screw 19 by 72°, after rough adjustment by the screw 23, it is possible to adjust finely the pressure to the magnetic head 17.

Further, if it is not necessary to do a rough adjustment to the magnetic head due to the high precision of the manufactured parts constituting the magnetic head assembly, the stop position of the head arm may be stationary except the screw 23.

Still further, in the above embodiment, on both arms of the head arm 14 and the carriage arm 11 are disposed respectively the plate spring 19, bridge 20 and pressure adjusting screw 22 to adjust the pressure of the pivot plate spring 18, however, those may be disposed on other arm of the two.

Figure 4:
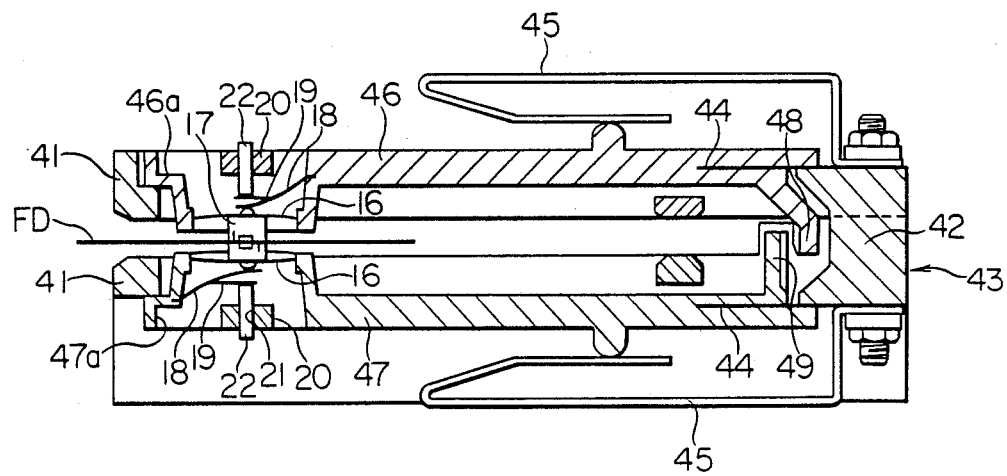
FIG. 4 is a side view partially in section of another embodiment of the present invention for explaining the magnetic head support assembly.

Moreover, the present embodiment is described of the carriage system using a single swing type in which the head arm 14 opens from the carriage arm 11, but the double leaf type of carriage as shown in FIG. 4 in which two head arms are mounted on both sides also may be used.

Figure 2:
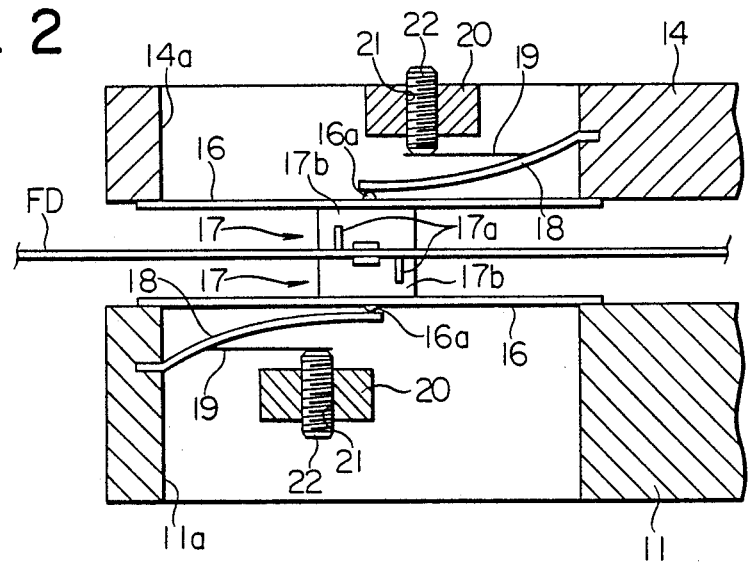
FIG. 2 is an enlarged side view partially in section of the head of FIG. 1.

FIG. 4 shows another embodiment of the present invention, in which the explanations of the identical numerical references with the ones used in FIGS. 1 through 3 are omitted.

In FIG. 4, head arms 46 and 47 are supported, through an arm plate spring 44 and a pressure spring 45, on both sides of the mounting portion 42 which is formed on the other side of the frame-like carriage body 43 while, on one side thereof, arm stoppers 41, 41 are formed. The tip ends of the head arms 46 and 47 are adapted to about the arm stopper 41 of the carriage body 43 respectively. Also the head arms 46 and 47 have the engage projections 48 and 49 formed thereon to link the opening and closing operations together. Further, each head arm 46 and 47 has mounting portions 46a and 47a respectively, on which the magnetic heads 17, 17 are mounted likewise in FIG. 1.

Thus, also in this embodiment, likewise in the embodiment illustrated in FIGS. 1 through 3, it is possible to adjust finely the pressure of the magnetic head 17 against the floppy disc, so that an excellent contact condition of the magnetic head with the floppy disc FD can be obtained.

Further, in the above embodiment, each plate spring mentioned above may be constituted in different shape and in different member.

As explained above, according to the magnetic head support assembly for the floppy disc device of the present invention, it is possible to adjust finely the pressure of the magnetic head against the magnetic disc. Further, an excellent contact condition between the magnetic head and the track of the magnetic disc can be obtained.

What is claimed is:

1. A head supporting assembly able to read data from and write data on either side of a disk having two sides, comprising:

a pair of head means for reading data from and writing data on both sides of the disk;

a pair of flexible head supporting plates for movably supporting the head means, respectively;

a pair of head supporting means, opposed to each other, each for supporting one of the head supporting plates, at least one of the head supporting means being pivotable toward and away from the other head supporting means;

a pair of pivot spring means, each mounted on one of the head supporting means, for supporting the head supporting plates;

pressure spring means for forcing the head supporting means so that in one of the reading and writing operations the head means contact the disk;

in one of the reading and writing operations, the flexible head supporting plates and the pivot spring means bend and provide first pressing forces for maintaining close operative relation between the head means and the disk;

adjusting spring means for providing a second pressing force with the pivot spring means, the adjusting spring means having higher flexibility than that of the pivot spring means; and pressure adjusting means for finely adjusting the first pressing forces for the head means by adjusting the second pressing force.

2. A head supporting assembly according to claim 1, wherein the pressure adjusting means includes a screw, the tip end of which contacts with the adjusting spring means, for adjusting and deflection of the adjusting spring means.

3. A head supporting assembly according to claim 1, further comprising stopper means for stopping the pivot movement of one of the head supporting means toward the other head supporting means so that a distance between the head supporting means is maintained in the reading and writing operations.

4. A head supporting assembly according to claim 3, further comprising a second pressure adjusting means for roughly adjusting the first pressing forces by adjusting the distance between the head supporting means in the reading and writing operations.

5. A head supporting assembly according to claim 4, wherein the second pressure adjusting means includes a screw, one end of which is mounted on one of the head supporting means and the other end of which contacts the other head supporting means.

* * * * *